US011306195B2

(12) United States Patent
Brady et al.

(10) Patent No.: US 11,306,195 B2
(45) Date of Patent: *Apr. 19, 2022

(54) DISCONTINUOUS-FIBER COMPOSITES AND METHODS OF MAKING THE SAME

(71) Applicant: SOUTH DAKOTA BOARD OF REGENTS, Pierre, SD (US)

(72) Inventors: Andrew T. Brady, Rapid City, SD (US); Bert D. Mannhalter, Rapid City, SD (US); David R. Salem, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,742

(22) Filed: Feb. 5, 2021

(65) Prior Publication Data

US 2021/0163713 A1    Jun. 3, 2021

Related U.S. Application Data

(63) Continuation of application No. 15/307,196, filed as application No. PCT/US2016/046536 on Aug. 11, 2016, now Pat. No. 10,920,041.

(Continued)

(51) Int. Cl.
*C08K 7/06* (2006.01)
*B32B 7/02* (2019.01)
(Continued)

(52) U.S. Cl.
CPC ................ *C08K 7/06* (2013.01); *B29B 7/007* (2013.01); *B29B 7/46* (2013.01); *B29B 7/90* (2013.01);
(Continued)

(58) Field of Classification Search
CPC ...... C08L 23/12; C08L 51/06; B32B 37/1018; B32B 5/08; B32B 2260/046;
(Continued)

(56) References Cited

U.S. PATENT DOCUMENTS 3,432,295 A * 3/1969 Barr ........................ C22C 47/14
419/19
3,510,275 A 5/1970 Schwope et al.
(Continued)

FOREIGN PATENT DOCUMENTS

GB 1493837 11/1977
JP 501561 B 1/1975
(Continued)

OTHER PUBLICATIONS

Wadsworth et al., "Load Transfer from Broken Fibres in Composite Materials", Brit. J. Appl. Phys., vol. 1, pp. 1049-1058, 1968.
(Continued)

*Primary Examiner* — Vishal I Patel
(74) *Attorney, Agent, or Firm* — McKee, Voorhees & Sease, PLC

(57) ABSTRACT

The invention relates to compositions comprising composite materials comprised of discontinuous fibers and one or more polymers and/or oligomers. The invention relates to methods of making the same. The composite materials can be in the form of compositions, composite sheets, laminates, pellets, and/or shaped composite products.

15 Claims, 6 Drawing Sheets

Related U.S. Application Data

(60) Provisional application No. 62/203,810, filed on Aug. 11, 2015.

(51) Int. Cl.

| | | |
|---|---|---|
| *B29C 43/24* | (2006.01) | |
| *C08K 7/14* | (2006.01) | |
| *B32B 5/26* | (2006.01) | |
| *B32B 27/12* | (2006.01) | |
| *C08K 7/02* | (2006.01) | |
| *B29B 7/46* | (2006.01) | |
| *B29B 7/90* | (2006.01) | |
| *B32B 15/14* | (2006.01) | |
| *C08L 51/06* | (2006.01) | |
| *B32B 5/08* | (2006.01) | |
| *B29B 7/00* | (2006.01) | |
| *B32B 5/02* | (2006.01) | |
| *C08L 23/12* | (2006.01) | |
| *B29C 48/21* | (2019.01) | |
| *B29C 48/00* | (2019.01) | |
| *B29C 48/92* | (2019.01) | |
| *B29C 48/76* | (2019.01) | |
| *B29C 48/40* | (2019.01) | |
| *B29C 48/08* | (2019.01) | |
| *B29C 48/285* | (2019.01) | |
| *B29C 48/05* | (2019.01) | |
| *B29C 48/35* | (2019.01) | |
| *B29C 48/625* | (2019.01) | |
| *B29C 48/405* | (2019.01) | |
| *B32B 15/04* | (2006.01) | |
| *B32B 27/06* | (2006.01) | |
| *B32B 37/14* | (2006.01) | |
| *B29B 7/82* | (2006.01) | |
| *B29B 7/84* | (2006.01) | |
| *B29B 7/72* | (2006.01) | |
| *B29B 7/60* | (2006.01) | |
| *B32B 37/10* | (2006.01) | |
| *B29C 48/475* | (2019.01) | |
| *B29C 48/04* | (2019.01) | |
| *B29C 48/485* | (2019.01) | |
| *B29L 7/00* | (2006.01) | |

(52) U.S. Cl.
CPC .......... *B29C 43/24* (2013.01); *B29C 48/0018* (2019.02); *B29C 48/0022* (2019.02); *B29C 48/05* (2019.02); *B29C 48/08* (2019.02); *B29C 48/21* (2019.02); *B29C 48/2886* (2019.02); *B29C 48/35* (2019.02); *B29C 48/402* (2019.02); *B29C 48/405* (2019.02); *B29C 48/625* (2019.02); *B29C 48/761* (2019.02); *B29C 48/92* (2019.02); *B32B 5/02* (2013.01); *B32B 5/08* (2013.01); *B32B 5/26* (2013.01); *B32B 7/02* (2013.01); *B32B 15/04* (2013.01); *B32B 15/14* (2013.01); *B32B 27/06* (2013.01); *B32B 27/12* (2013.01); *B32B 37/142* (2013.01); *C08K 7/02* (2013.01); *C08K 7/14* (2013.01); *C08L 23/12* (2013.01); *C08L 51/06* (2013.01); *B29B 7/005* (2013.01); *B29B 7/603* (2013.01); *B29B 7/726* (2013.01); *B29B 7/82* (2013.01); *B29B 7/845* (2013.01); *B29C 48/04* (2019.02); *B29C 48/475* (2019.02); *B29C 48/485* (2019.02); *B29L 2007/002* (2013.01); *B32B 37/1018* (2013.01); *B32B 2260/021* (2013.01); *B32B 2260/023* (2013.01); *B32B 2260/046* (2013.01); *B32B 2262/02* (2013.01); *B32B 2262/0269* (2013.01); *B32B 2262/101* (2013.01); *B32B 2262/105* (2013.01); *B32B 2262/106* (2013.01); *B32B 2262/14* (2013.01); *B32B 2305/22* (2013.01); *B32B 2307/202* (2013.01); *B32B 2307/302* (2013.01); *B32B 2307/54* (2013.01); *B32B 2307/546* (2013.01); *B32B 2605/00* (2013.01); *B32B 2607/00* (2013.01)

(58) Field of Classification Search
CPC ........ B32B 2260/023; B32B 2260/021; B32B 2262/02; B32B 2305/22; B32B 2307/302; B32B 7/02; B32B 15/04; B32B 2307/546; B32B 5/02; B32B 37/142; B32B 2262/105; B32B 2307/202; B32B 27/12; B32B 2262/101; B32B 2262/14; B32B 2607/00; B32B 2262/106; B32B 2605/00; B32B 15/14; B32B 2307/54; B32B 2262/0269; B32B 5/26; B29C 48/0022; B29C 48/761; B29C 48/475; B29C 48/08; B29C 48/625; B29C 48/402; B29C 48/05; B29C 48/485; B29C 48/04; B29C 43/24; B29C 48/21; B29C 48/0018; B29C 48/92; B29C 48/35; B29C 48/405; B29C 48/2886; B29B 7/82; B29B 7/603; B29B 7/46; B29B 7/007; B29B 7/90; B29B 7/005; B29B 7/726; B29B 7/845; B29L 2007/002; C08K 7/06; C08K 7/14; C08K 7/02

See application file for complete search history.

(56) References Cited

U.S. PATENT DOCUMENTS

| | | |
|---|---|---|
| 5,093,050 A | 3/1992 | Tepic |
| 6,083,586 A * | 7/2000 | Andersen ................ C04B 26/28 428/36.4 |
| 6,255,368 B1 | 7/2001 | English et al. |
| 7,576,147 B2 | 8/2009 | Drzal et al. |
| 10,920,041 B2 * | 2/2021 | Brady ................ B29C 48/0022 |
| 2005/0074993 A1 | 4/2005 | Alam et al. |
| 2011/0256370 A1 | 10/2011 | Roebroeks et al. |
| 2013/0157001 A1 | 6/2013 | Knoff et al. |
| 2014/0256850 A1 | 9/2014 | Gerard et al. |

FOREIGN PATENT DOCUMENTS

| | | |
|---|---|---|
| JP | 3030916 A | 2/1991 |
| JP | 2001277336 A | 10/2001 |
| WO | 9409972 A2 | 5/1994 |
| WO | 9634045 A1 | 10/1996 |

OTHER PUBLICATIONS

Madera-Santana et al., "Extrusion and Mechanical Characterization of PVC-Leather Fiber Composites", Polymer Composites, vol. 19, No. 4, pp. 431-439, 1998.

South Dakota Board of Regents, PCT/US2016/046536 filed Aug. 11, 2016, "The International Search Report and the Written Opinion of the International Searching Authority", 10 pages, dated Oct. 28, 2016.

South Dakota Board of Regents, "Search Report", European Patent Office in connection with patent application 16835906.5, 8 pages, dated Feb. 1, 2019.

* cited by examiner

DISCONTINUOUS-FIBER COMPOSITES AND METHODS OF MAKING THE SAME

CROSS-REFERENCE TO RELATED APPLICATIONS

This is a Continuation Application of U.S. Ser. No. 15/307,196, filed Oct. 27, 2016, which claims priority to a National Phase Application under 35 U.S.C. § 371 of PCT/US16/46536 filed on Aug. 11, 2016, which claims priority under 35 U.S.C. § 119 to provisional application Ser. No. 62/203,810, filed Aug. 11, 2015, all of which are hereby incorporated by reference in their entirety.

FIELD OF THE INVENTION

The invention relates to composite materials comprising discontinuous fibers and one or more polymers and/or oligomers, and methods of making the same.

BACKGROUND OF THE INVENTION

Reinforced composites have applications in many industries, including, automotive, construction, aerospace, and energy. Some fiber reinforced composites, including, continuous carbon fiber, glass fiber, and aramid fiber prepared in a polymer matrix have demonstrated superior specific strength (strength per unit mass) and/or specific stiffness (stiffness per unit mass) when compared with high performance metals and metal alloys. High performance fiber reinforced composites, comprising for example continuous high strength carbon fibers embedded in a thermosetting matrix such as epoxy, have been used in demanding applications such as for structural materials in military aircraft. However, the high cost of the materials and the high cost of the manufacturing process has precluded the use of these advanced materials in high volume industrial and/or consumer applications, where there are large markets for materials with high specific strength and/or stiffness properties. For example, the automotive industry has an urgent need to reduce the weight of structural and semi-structural components in vehicles to meet the 2025 CAFE average fuel consumption standard of 54.5 miles/gallon, but the high cost of fiber reinforced composites manufactured by conventional methods has greatly impeded the adoption of these materials in automotive applications.

In addition to high cost, composites comprising polymers reinforced with continuous fibers have the drawback that they are difficult to form into shapes with significant or sharp bends or contours, as a result of the tendency of composites containing continuous fibers to buckle and wrinkle when deformed.

Both the cost of production and ability to form shapes with sharp bends or contours can be improved by producing composites using discontinuous (chopped) fibers in a thermoplastic polymer matrix. However, the mechanical properties of composites comprising discontinuous fibers are generally much poorer than composites containing continuous fibers. This arises from the lower level of load transfer between discontinuous fibers. While it is known that some important mechanical properties of discontinuous fiber reinforced composites—especially strength and impact resistance—are enhanced when fiber length is increased, commercially feasible processes for adequately dispersing discontinuous fibers in a thermoplastic polymer matrix generally cause a high degree of fiber breakage, resulting in a composite comprising very short fibers or, so-called milled fibers. Additionally, the anisotropic mechanical properties of the fibers, whereby strength and stiffness are exceptionally high along the fiber axis, can be almost fully exploited with continuous fibers, which can be readily aligned or can retain their alignment during standard composite manufacturing processes. On the other hand, discontinuous fibers are typically supplied in a largely disoriented state, in addition to which processes for mixing and dispersing these fibers in a polymer matrix will generally lead to randomization of fiber orientation, or to localized regions of orientation resulting from resin flow patterns which are difficult to engineer or control. For at least these reasons, the use of discontinuous fibers in preparation of high performance reinforced composites has seen limited commercial utilization.

Therefore, there is a need for high performance reinforced composites that can be prepared in a manner that allows the formation of curves, bends, and contours for diverse applications while optimizing physical and mechanical properties of the composites, including, for example, strength, stiffness, ductility, and weight. Further, there is a need to produce such composites at a lower cost so that it is feasible for high volume markets and products. Further, there is a need for a process which can produce such composites utilizing recycled, reclaimed, and/or recovered fibers, especially recycled, reclaimed, and/or recovered carbon fibers which are becoming commercially available in large volumes and at low cost compared to virgin carbon fibers.

Accordingly, it is an objective of the claimed invention to provide high performance reinforced composites prepared with discontinuous fiber that have desired properties.

A further object of the invention is to provide methods for preparing high performance reinforced composites prepared from discontinuous fibers. Preferably, the methods provide a production cost that is feasible for high volume products and markets.

BRIEF SUMMARY OF THE INVENTION

The present invention relates to reinforced composite materials comprising discontinuous fibers and methods of making the same. The present invention relates to compositions, laminates, and/or shaped composite products comprising composite sheets and methods of preparing the same. The compositions, laminates, and/or shaped composite products comprise discontinuous fibers and one or more polymers and/or oligomers. The compositions can be prepared by mixing discontinuous fibers and one or more polymers and/or oligomers to form a mixture; rolling the mixture to form a composite sheet; and optionally drawing the composite sheet. The method can further comprise a laminating step. The method can further comprise a forming step where a composite sheet, pellets formed from the composite sheet, and/or a laminate can be formed into a shaped composite product. In an aspect of the invention, the compositions, composite sheets, laminates, and/or shaped composite products have improved properties.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
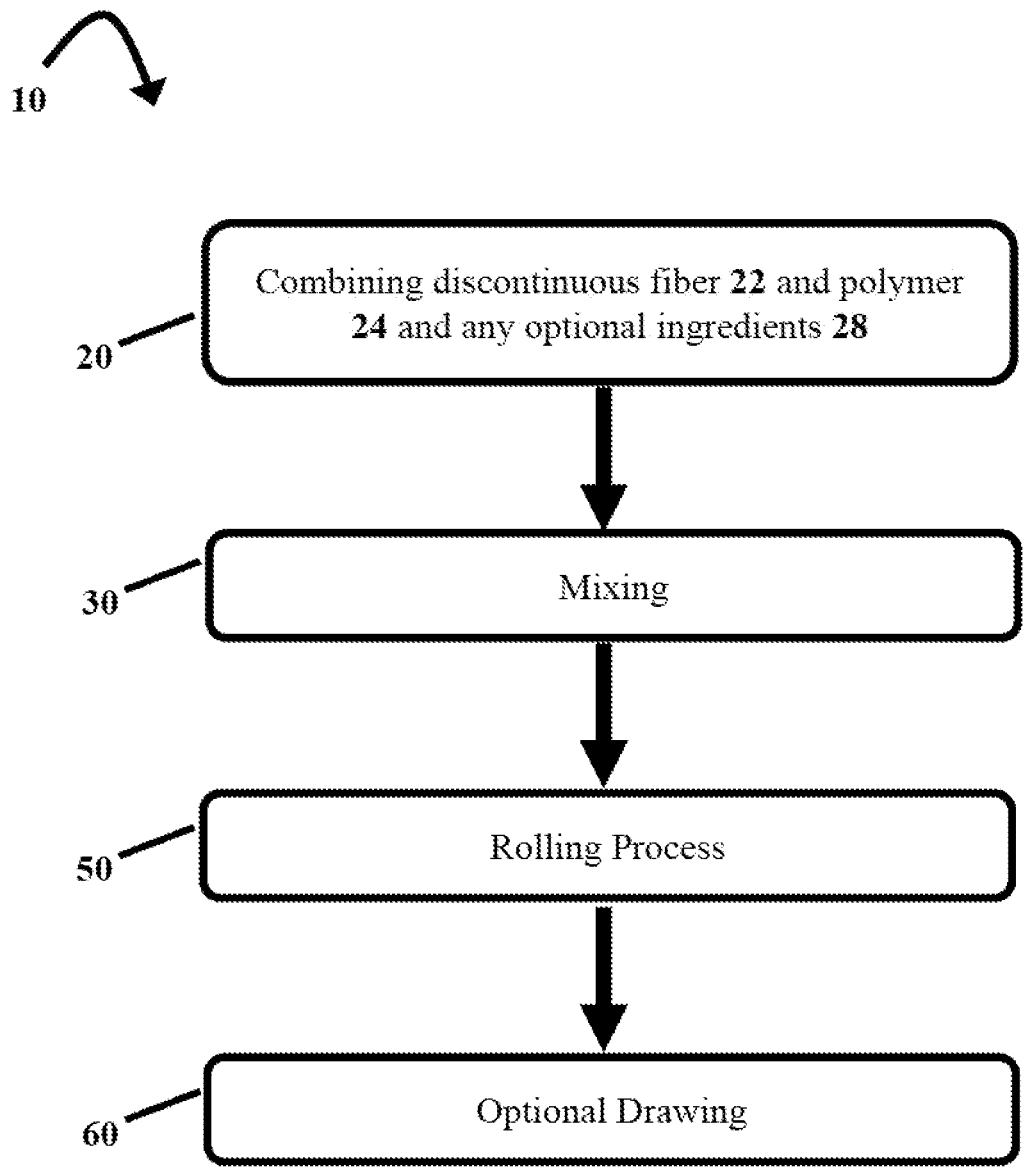
FIG. 1 is a flow diagram illustrating an exemplary method of preparing reinforced composites with discontinuous fiber according to the invention.

Various embodiments of the present invention are described in detail with reference to the figures. The reference to various embodiments does not limit the scope of the invention. Figures represented herein are not limitations to the various embodiments according to the invention and are presented for exemplary illustration of the invention.

DETAILED DESCRIPTION OF THE INVENTION

In the present invention, superior, engineered mechanical and/or physical properties are achieved in composites comprising discontinuous fiber reinforcement by a process that permits high volume production of composite sheets at commercially viable cost. The inventive method is designed such that fiber length attrition during processing is minimized and such that the fibers are significantly oriented in one direction as a result of fiber alignment taking place in one or more stages of the process. As a result of superior preservation of fiber length, and the oriented state of the fibers, the resulting fiber-reinforced sheets, and the laminated composites produced by consolidating them, exhibit unusually high strength and stiffness properties in the direction of fiber orientation compared with discontinuous fiber-reinforced composites produced by conventional methods. This method permits new degrees of freedom in engineering composite materials for demanding, cost sensitive applications and is well-suited to the inexpensive utilization of recycled, reclaimed, and/or recovered fibers.

The embodiments of this invention are not limited to end uses for the composites, which can vary. It is further to be understood that all terminology used herein is for the purpose of describing particular embodiments only, and is not intended to be limiting in any manner or scope. So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

As used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer, fraction, and decimal within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range such as 1, 2, 3, 4, 5, and 6, fractions such as 1¾, 3⅓, and 4⅝, and decimals such as 2.3, 4.1, and 5.7. This applies regardless of the breadth of the range.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the term "oligomer" refers to a molecule comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecule comprised of a more than ten monomeric units and generally includes, but is not limited to, homopolymers, copolymers, such as for example, block, graft, random and alternating copolymers, terpolymers, and higher "x" mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

Methods of Preparing Reinforced Composites with Discontinuous Fiber

As shown generally in FIG. 1, an aspect of the invention is a method 10 of preparing reinforced composites with discontinuous fiber. Preferably the methods of the invention are for a continuous process 12, although in some embodiments, the production can be performed in a batch process 14. The method 10 can be a continuous process or a batch process. A feed system 18 can provide the discontinuous fiber 22 and polymer 24 and any optional ingredients 28. Any appropriate feed system 18 can be used. The discontinuous fiber 22, polymer 24, and any optional ingredients 28 are combined 20. The combining 20 can be done in the feed system 18 or outside of the feed system 18. In an aspect of the invention, the combining 20 can be performed by the feed system 18 feeding the various components individually into a combining location, such as, an extruder or mixing apparatus, or other container. The discontinuous fibers 22 and a polymer 24 and any optional ingredients 28 can be mixed 30 to form a mixture. The mixing 30 can be done in any suitable manner appropriate for the desired end product and may be dependent upon whether the production is a continuous or batch process. The mixture can then be sent through a rolling process 50 to form a composite sheet. Optionally, the composite sheet can be drawn 60.

Figure 2A:
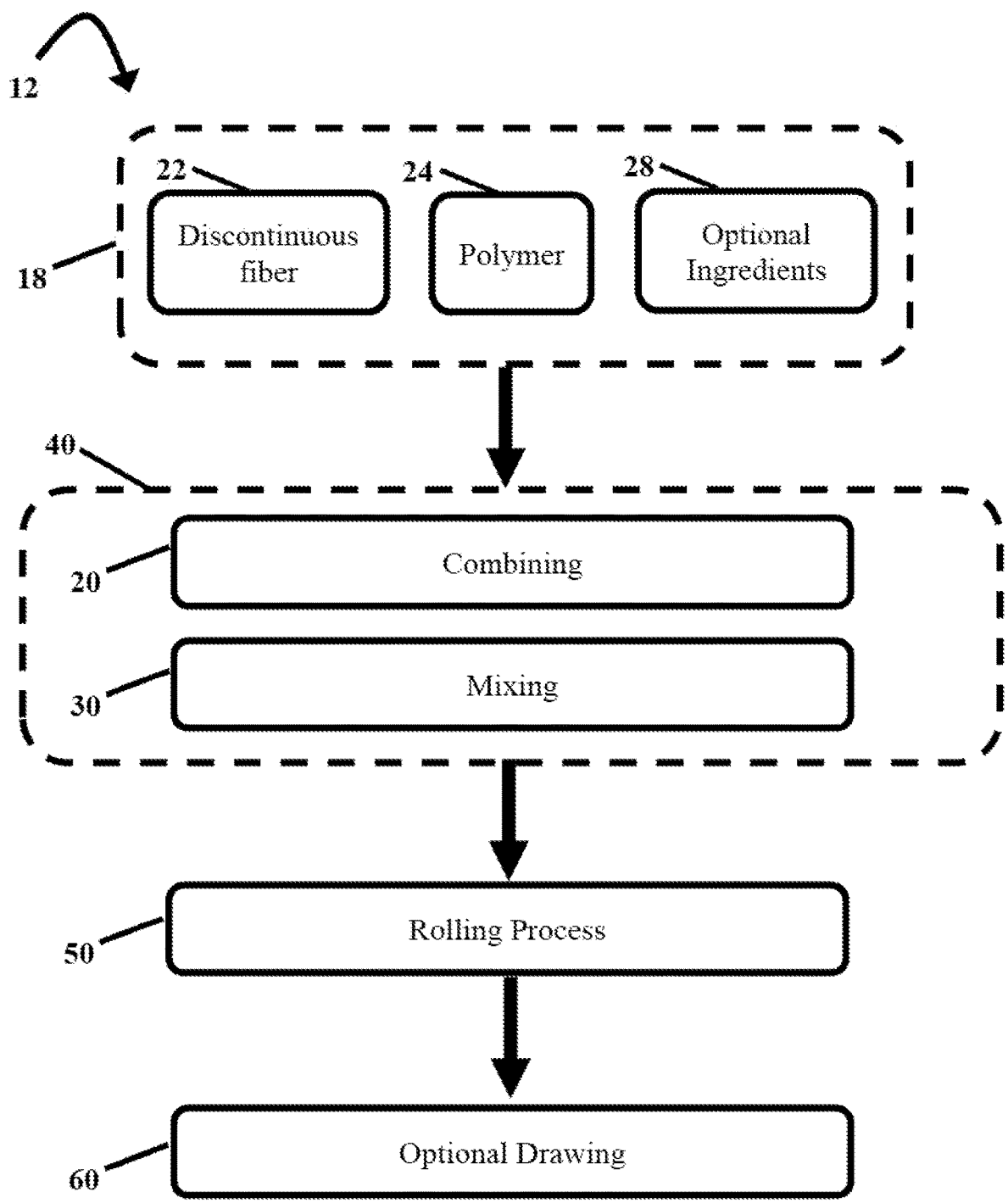
FIG. 2A is a flow diagram illustrating an exemplary method of preparing reinforced composites with discontinuous fiber in a continuous process according to the invention.

FIG. 2A shows an exemplary continuous process 12. A feed system 18 can provide the discontinuous fiber 22, polymer 24, and any optional ingredients 28 to a combining location 40. The discontinuous fiber 22, polymer 24, and any optional ingredients 28 can be combined 20 in the combining location 40. The mixing 30 of the discontinuous fiber 22, polymer 24, and any optional ingredients 28 can also take place in a combining location 40. The mixture can then be provided to a rolling process 50. Optionally, the composite sheet can be drawn 60. In another embodiment (not shown in FIG. 2), the discontinuous fibers 22 and polymer 24 can be combined 20 prior to being added to the combining location 40.

Figure 2B:
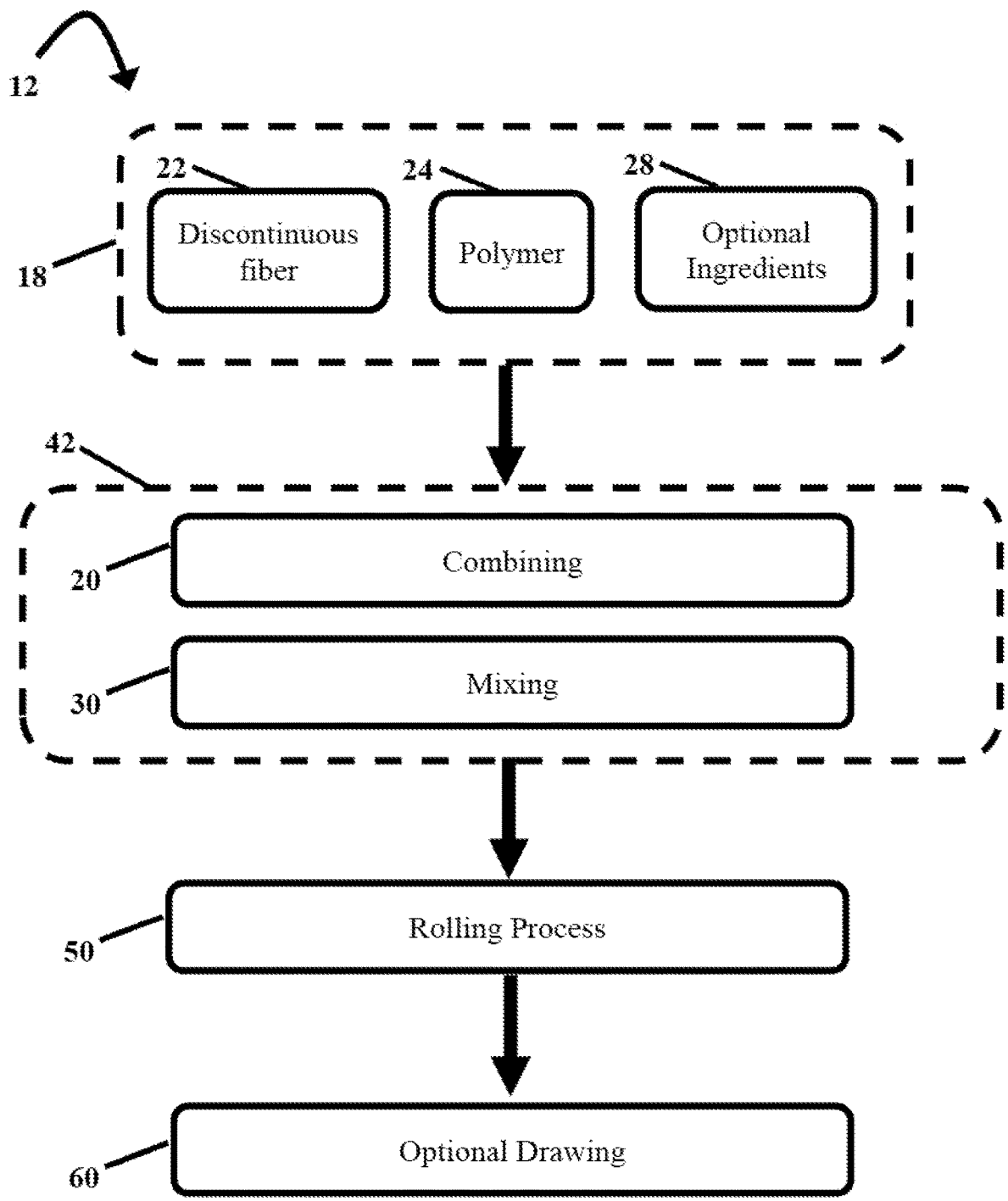
FIG. 2B is a flow diagram illustrating an exemplary method of preparing reinforced composites with discontinuous fiber in a continuous process using an extruder according to the invention.

FIG. 2B shows an exemplary continuous process 12 employing an extruder 42 as the combining location. A feed system 18 can provide the discontinuous fiber 22, polymer 24, and any optional ingredients 28 to an extruder 42. The discontinuous fiber 22, polymer 24, and any optional ingredients 28 can be combined 20 in the extruder 42. The mixing 30 of the discontinuous fiber 22, polymer 24, and any optional ingredients 28 can also take place in an extruder 42. The extrudate can then be provided to a rolling process 50. Optionally, the composite sheet can be drawn 60. In another embodiment (not shown in FIG. 2), the discontinuous fibers 22 and polymer 24 can be combined 20 prior to being added to the extruder 42.

Figure 3:
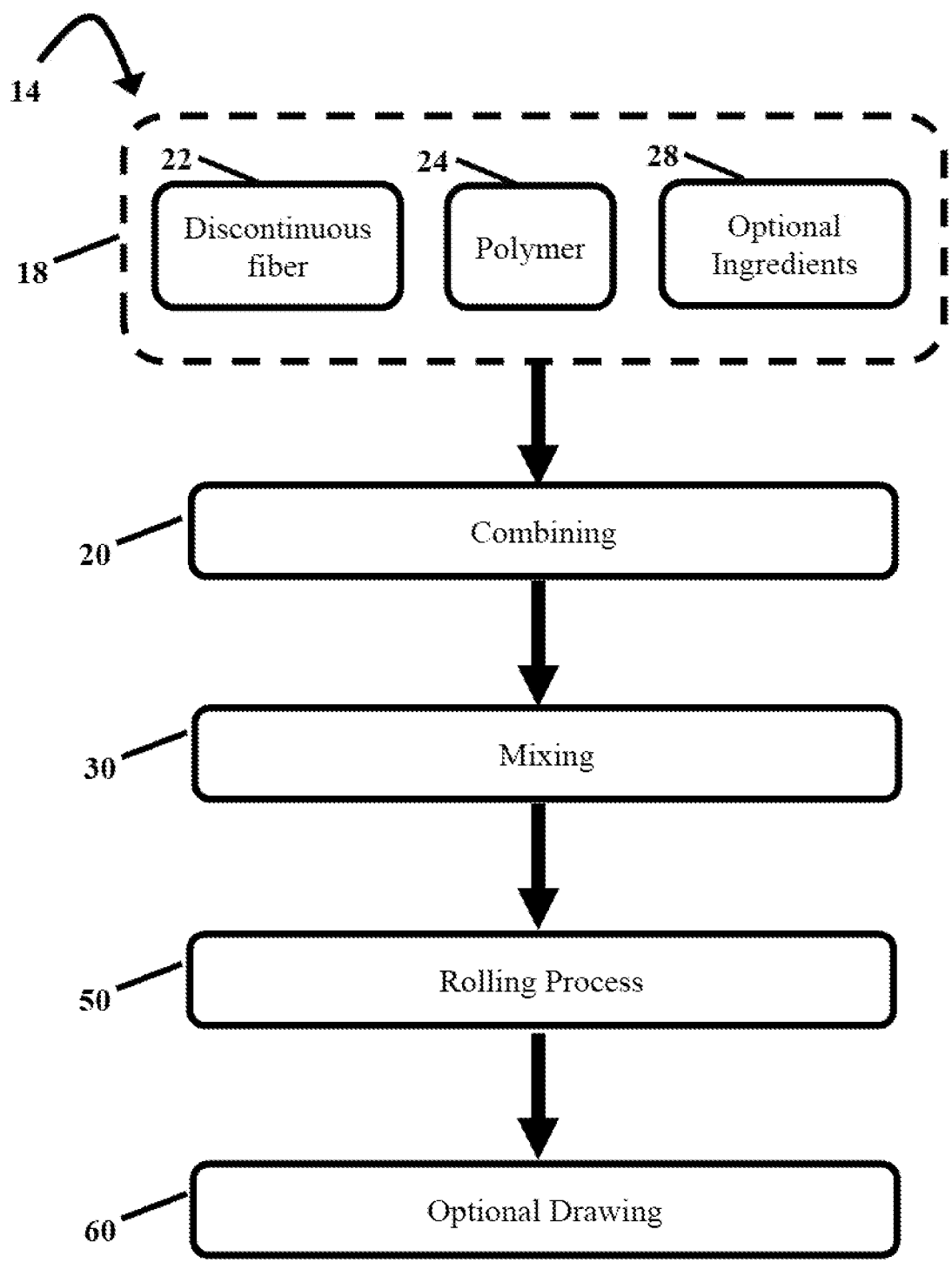
FIG. 3 is a flow diagram illustrating an exemplary method of preparing reinforced composites with discontinuous fiber in a batch process according to the invention.

FIG. 3 shows an exemplary batch process 14. The reinforced composites of the invention can be prepared by combining 20 discontinuous fiber 22, polymer 24, and any optional ingredients 28 in a combining location, such as, an extruder or mixing apparatus, or other container. The discontinuous fiber 22, polymer 24, and any optional ingredients 28 are then mixed 30 and a mixture can then be fed to a rolling process 50. Optionally, the rolled material can be drawn 60.

Figure 4A:
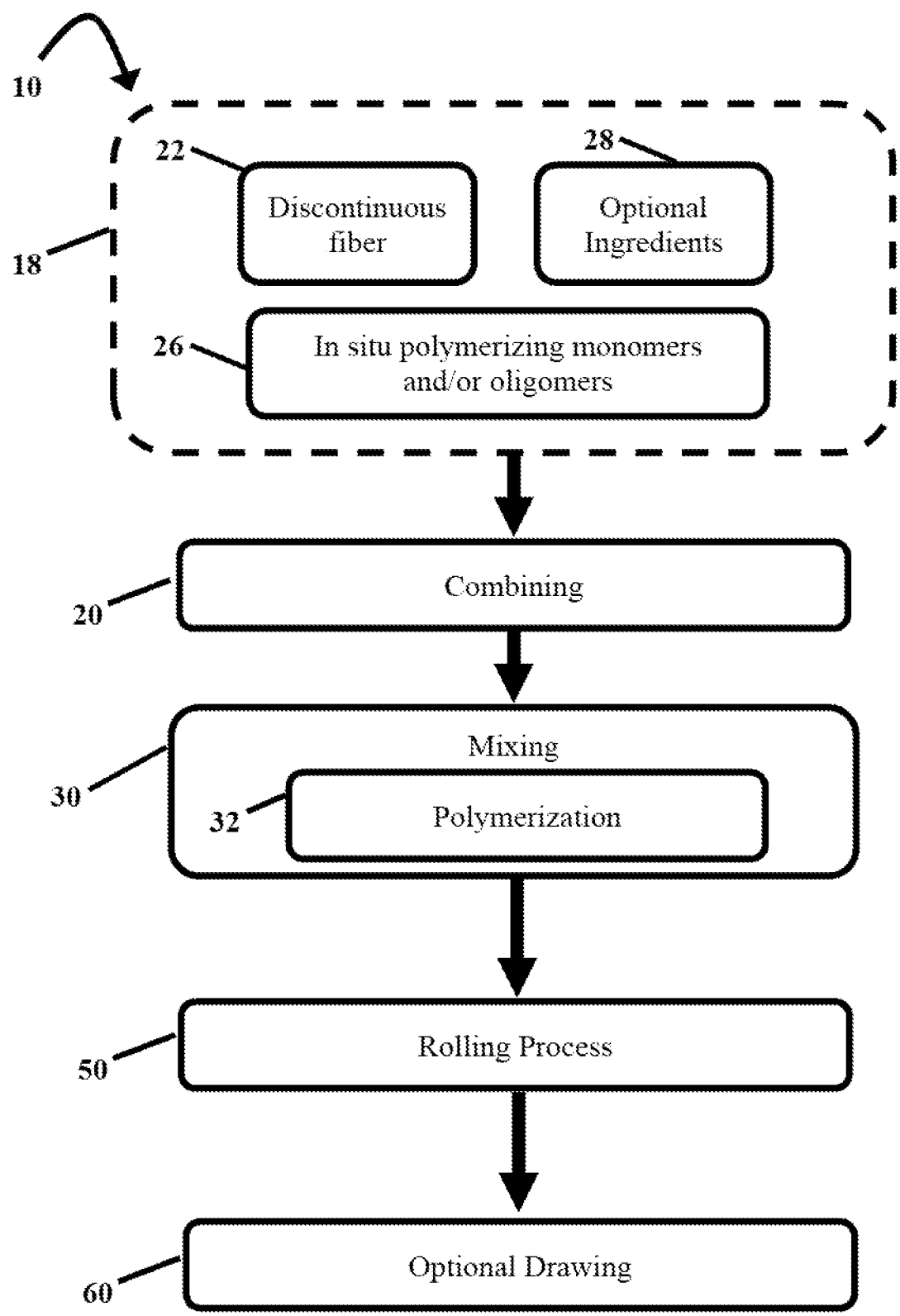
FIGS. 4A and 4B are flow diagrams illustrating exemplary methods of preparing reinforced composites with discontinuous fiber and in situ polymerizing polymers and/or oligomers according to the invention.
Figure 4B:
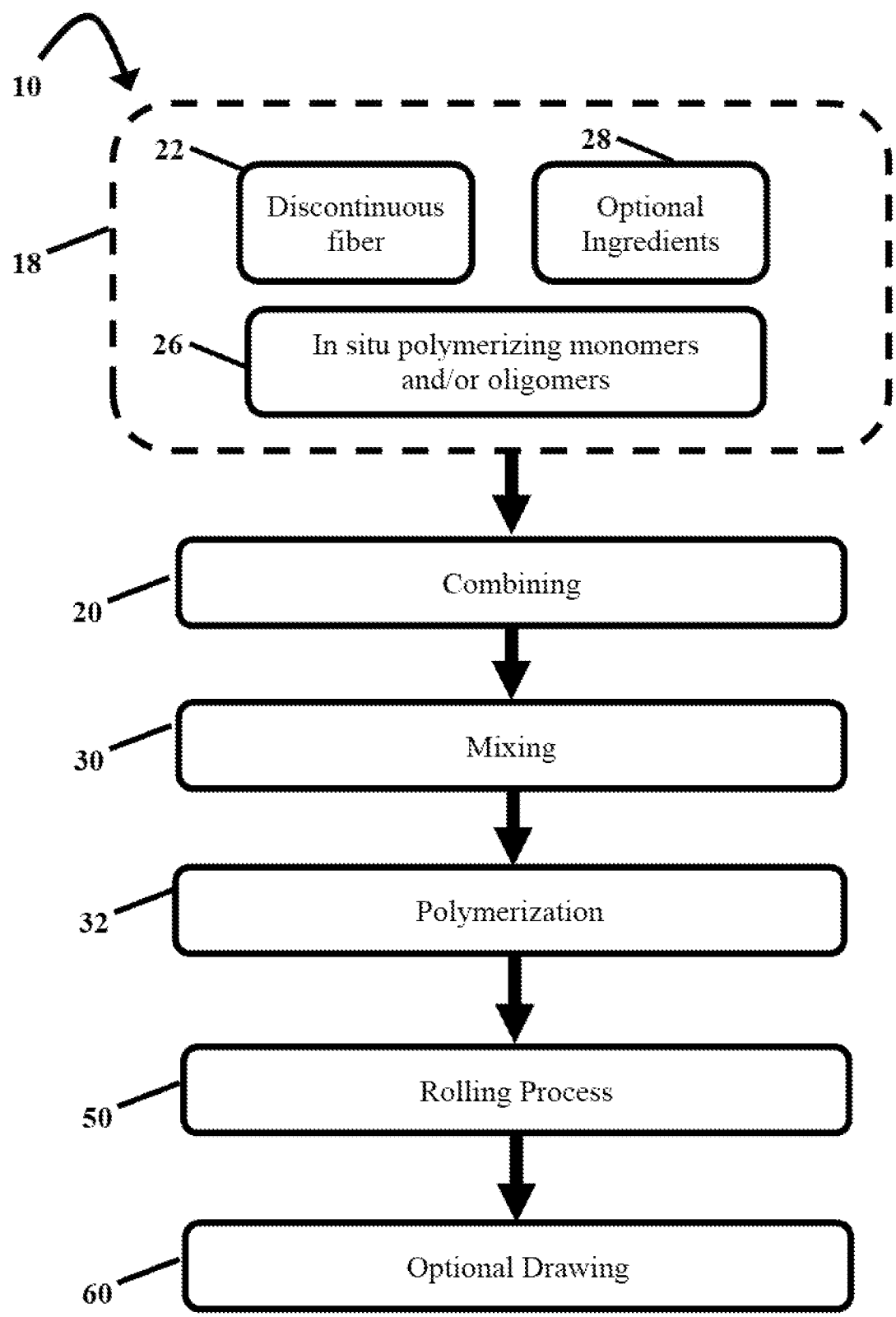

As shown in FIGS. 4A and 4B, a feed system 18 can provide discontinuous fibers 22, in situ polymerizing monomers and/or oligomers 26, and any optional ingredients 28. The discontinuous fibers 22, in situ polymerizing monomers and/or oligomers 26, and any optional ingredients 28 can then be combined 20 and then mixed 30 in a combining location, such as, an extruder or mixing apparatus, or other container. The polymerization 32 can take place during the mixing 30 (as shown in FIG. 4A) or after the mixing 30 (as shown in FIG. 4B). The mixed material can then be fed to a rolling process 50 to form a composite sheet. Optionally, the composite sheet can be drawn 60.

In any of the forgoing exemplary embodiments and in any other embodiments of the invention employing an extruder as the combining location, the extrudate can be fed to the rolling process 50 without passing the extrudate through a die, or by passing the extrudate through a die that is larger than the opening of the extruder, or by passing the extrudate through a die that is geometrically smaller than the opening of the extruder, or by passing the extrudate through a die that is the same size as the opening of the extruder.

In certain embodiments using an extruder 42, the extruder 42 can be a twin screw extruder equipped with an intermeshing co-rotating twin-screw side feeder which delivers the fiber into the extruder. The selection and arrangement of mixing sections downstream of the fiber feed zone are designed to provide mixing and dispersion of the fibers while causing minimal reduction in fiber length.

The methods of the invention can further comprise a laminating step to form a laminate. In an aspect of the invention, the laminate can be prepared with composite sheets prepared by the methods of the invention combined with other sheets prepared by other methods including but not limited to composite sheets, polymer sheets, metal sheets. In another aspect of the invention, the laminate can consist of composite sheets prepared by methods of the invention.

The composite sheets, composite pellets, and/or laminates of the invention can be formed into shaped composite products. Shaped composite products can be prepared by any suitable means, including, but not limited to compression molding, injection molding, and thermoforming. In this respect, the methods of the invention can further comprise a step of forming a shaped composite product.

Any discontinuous fibers 24 can be used in the invention. The selection of the type of discontinuous fiber can be based on variety of factors. Those factors can include, but are not limited to, strength, stiffness, ductility, melting temperature, thermal conductivity, electrical conductivity, density, weight, cost, and end-use of the composite. Suitable fibers can include, but are not limited to, carbon fibers, ceramic fibers, glass fibers, graphite fibers, mineral-based fibers, natural fibers, and polymeric fibers. Preferred mineral-based fibers include, but are not limited to basalt fibers. Preferred natural fibers, include, but are not limited to jute and hemp fibers. Preferred polymeric fibers, include, but are not limited to, aromatic polyester fibers, aramid fibers, cellulosic fibers, polyether ether ketone fibers, poly(p-phenylene-2,6-benzobisoxazole) (PBO) fibers, high modulus polyethylene fibers, and high modulus polypropylene fibers. Preferred fibers include carbon fibers, glass fibers, and aramid fibers.

The discontinuous fiber can be present in the composite at a load of between about 2 wt. % and about 75 wt. %, preferably between about 15 wt. % and about 65 wt. %.

Suitable polymers 26 include thermoplastic polymers and thermoset polymers. In situ polymerizing monomers and/or oligomers 26 can also be used, whereby polymerization 32 may occur during the fiber mixing process 30 or after the mixing process is complete 34. Discussion of the polymers in this application should be understood to encompass the polymers and their pre-cursor materials.

Suitable thermoplastic polymers include, but are not limited to: polyamides, including but not limited to polyamide 6, polyamide 66, polyamide 11 and polyamide 12; polyesters, including but not limited to polyethylene terephthalate and polybutylene terephthalate; polytetrafluoroethylene; polystyrenes, polymethyl(methacrylate)s; polyolefins, including but not limited to polyethylenes and polypropylenes; thermoplastic polyurethanes; polystyrenes, polyvinyl alcohols, polyvinyl chlorides, polyvinyl alcohols, polyvinyl chlorides, poly(ether ketone), poly(ether ketone ketone), polyphenylene sulfide, polyetherimide, polycarbonate, acrylonitrile butadiene styrene. The matrix polymer may also be a co-polymer, comprising one or more polymers linked covalently, or a blend of two or more polymers in any ratio.

Suitable thermoset polymers include, but are not limited to, epoxies, bis-maleimides, phenolics, polyesters (vinyls or unsaturated), benzoxazines, cyanate esters, polyimides, thermosetting polyurethanes, unsaturated polyesters, polyurea, and silicone.

Suitable in situ polymerizing monomers and/or oligomers 26 include, but are not limited to: polyamide 6 that is in-situ polymerized from anionic polymerization grade caprolactam, polybutylene terephthalate that is in-situ polymerized from cyclic butylene terephthalate; (cBT); and polyamide 12 that is in-situ polymerized from anionic polymerization of laurolactam.

The polymer and/or oligomer can be present in the composite at a load of between about 25 wt. % and about 98 wt. %, preferably between about 35 wt. and about 85 wt. %.

Optional additional ingredients 28 can also be added into the mixture of polymer and discontinuous fiber. Such ingredients can be chosen to impart certain properties or characteristics of the composite, including, for example, improvement in physical properties or the addition of an aesthetic property such as color, or the reduction of thermal, UV or oxidative degradation, or the decrease of weight, or the increase of thermal insulation or sound insulation, or the increase of electrical conductivity or thermal conductivity, or the addition or enhancement of various other functionalities and multi-functionalities. These additives can be in the form of chemical compounds, microparticles, nanoparticles, nanofibers, and nanotubes.

In a preferred embodiment, the mixing is performed in an extruder 42. Many different types of extruders 42 can be used, including for example, hydrostatic extruders, ram extruders, and screw extruders. Preferred extruders 42 are screw extruders. Examples of suitable screw extruders include, but are not limited to, single-screw or twin-screw extruders. In some production methods, screw extruders can provide certain benefits over other extruders. For example, a screw extruder can mix the discontinuous fiber and polymer in the extrusion process. Thus, the mixing step 30 can be performed in the extruder. Another benefit of using a screw extruder is that the screw elements can be selected to optimize pressure or shear forces on the extrudate—polymer and discontinuous fiber—at any location in the extruder barrel as the extrudate travels through the extruder. This is because a screw extruder uses an auger type mechanism to move the extrudate through the extruder, while other types of extruders typically use pressure to force the extrudate through the extruder.

Typically, extruders ultimately feed into a die. Pressure forces the extrudate through the die. Thus, near the die, and upstream of the die, is a high pressure zone. In certain embodiments, it was found that much of the discontinuous fibers suffered from fiber length attrition. It was found that much of the fiber length attrition in an screw extruder was caused by conditions found in the backup zone, sometimes referred to as the metering or pumping zone, that relate to restriction of flow at the exit of the extruder caused by a die, device, accessory, or other mechanism that restricts flow—fiber length was found to be significantly maintained through the extrusion process up to the backup zone that is caused by restriction of flow at the extruder exit, but on entering this backup zone, fiber length can deteriorate almost immediately. Consequently the methods of the present invention do not require the use of a die or employ a die that restricts the flow in such a way that damage to the fibers or attrition of fiber length is minimized. This results in an extrudate incorporating fibers which have relatively well-preserved length.

The polymer and discontinuous fiber mixture is then fed into a rolling process 50 where the mixture is fed through one or more rollers that reduces the thickness and provides a uniform thickness. Two opposed surfaces that are moving in the same direction may be used. Suitable rolling processes include, but are not limited to, conveying the mixture through two opposed surfaces using a single roller, In an embodiment, the rolling process employs a two-roll mill or similar nip-roll or calendaring configuration, such that it is squeezed between one or more sets of rollers and is thereby formed into a continuous fiber reinforced sheet of predetermined thickness. Some rolling processes may include any number of sets of rollers or configurations employing one or more sets of an individual roller and an opposing surface and one or more sets of multiple rollers.

The rolling step 50 not only produces a reinforced sheet of uniform thickness without causing significant reduction in fiber length, it can also orient the fibers in the machine direction (along the length of the sheet) providing valuable anisotropic mechanical properties in the sheet and in the final laminated composite. For example tensile strength, flexural strength, tensile modulus and flexural modulus are commonly two to five times greater in the direction of fiber orientation)(0°) than transverse to it)(90°).

In certain embodiments, an additional step may be included in which the reinforced sheets are extended (or "drawn") to impart still greater fiber orientation in the machine direction or to provide some additional degree of preferred fiber alignment towards the transverse direction. The machine-direction drawing operation may, for example, be performed by roll drawing (commonly used in fiber and film processing to draw down the thickness or diameter of a film or fiber), whereby the sheet is extended between two sets of rolls in which the second set rotates at higher speed than the first set; or in a multistep roll-drawing process in which each set of rolls rotates faster than the previous set. As another example, a tenter frame may be used in a batch operation to draw the sheet and to impart further fiber alignment in the machine direction, and/or a tenter frame method may be used to provide some degree of transverse fiber alignment in a continuous and/or batch operation. Early results indicate that drawing the roll-milled fiber-reinforced sheets to a draw ratio of about 2 (in the direction of the existing fiber orientation) can more than double the tensile modulus of laminated composites comprising these sheets. Depending on the ingredients used in the composite and the desired properties, the draw ratio can be up to 15. Preferably the draw ratio will be at least 1.2, more preferably at least 1.5.

The inventive anisotropic fiber-reinforced sheets may be laminated and or shaped by stacking the sheets and applying one or more of a variety of processes, including continuous lamination between rolls, high temperature vacuum forming, compression molding, thermoforming, and pressure forming. The anisotropic sheets in the stack may be oriented in two or more directions to engineer the directional properties of the laminate, and may be combined with continuous-fiber reinforced thermoplastic sheets and/or fabric-reinforced thermoplastic sheets produced by various suitable methods. The sheets may also be cut into chips of suitable dimensions to, as far as possible, preserve the length of the fibers and their orientation, while allowing the chips to feed continuously into an injection molder. The chips can be pellets, which may be particularly useful for injection molding applications.

The methods of the invention can further comprise a feedback mechanism, temperature control, flow rate control, and other process controls. In some embodiments, the mixing and rolling steps can be separated so as to require transportation of the mixed (or extruded) polymer and discontinuous fiber composition to a rolling apparatus.

The composites prepared by the methods of the invention can have improved properties when compared to composites containing the same ingredients prepared through existing methods composite production. Properties that can be improved include, but are not limited, tensile strength, tensile modulus (stiffness), flexural strength, flexural modulus, load transfer, thermal conductivity, and electrical conductivity. Additionally, the composites can be prepared to have engineered layering—in terms of fiber orientation and/or fiber type—in order to achieve desired properties. Furthermore, discontinuous fiber reinforced sheets produced by the inventive process can be layered with sheets of continuous fiber reinforced sheets, in various sequences and orientations, to enable the creation of composites with a still broader range of engineered properties, while mitigating some of the problems associated with shape forming of continuous fiber reinforced composites on their own.

Compared with discontinuous fiber reinforced composites produced by existing methods, the improvement in tensile strength can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the tensile strength may approach that of a continuous fiber composite made of the same materials.

Compared with discontinuous fiber reinforced composites produced by existing methods, the improvement in tensile modulus can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the tensile modulus may approach that of a continuous fiber composite made of the same materials.

Compared with discontinuous fiber reinforced composites produced by existing methods, the improvement in flexural strength can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the flexural strength may approach that of a continuous fiber composite made of the same materials.

Compared with discontinuous fiber reinforced composites produced by existing methods, the improvement in flexural modulus can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the flexural modulus may approach that of a continuous fiber composite made of the same materials.

Compared with discontinuous fiber reinforced composites produced by existing methods, the improvement in thermal conductivity can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the thermal conductivity may approach, or preferably exceed, that of a continuous fiber composite made of the same materials.

Compared with discontinuous fiber reinforced composites produced by existing methods, the improvement in electrical conductivity, when carbon fibers or other electrically conductive fibers are used, can be at least about 1.2 times, 1.5 times, 2 times, 3 times, 4 times, 5 times, 6 times, 7 times, 8 times, 9 times, 10 times, and even more than 10 times that of a composite having the same ingredients prepared by a different method. In certain embodiments the electrical conductivity may approach, or preferably exceed, that of a continuous fiber composite made of the same materials.

In some embodiments of the invention the improvement may be in the combination of aforementioned properties as opposed to those properties independently relative to a composite having the same ingredients prepared by a different method. For example, the tensile strength may not be greater than that of another composite, but the tensile strength and thermal conductivity may be improved over that of the other composite. This can in part be due to the fact that often in preparing a composite to have particular properties compromises are made with respect to other properties, i.e., by improving a particular property other properties may be reduced.

Further, laminates and shaped composite products comprising the composite sheets or composite pellets can have the same improvement in properties as described for the composites above relative to a shaped composite products or laminates prepared with composites or composite pellets having the same ingredients but prepared by a different method.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Compounding was performed using a Coperion ZSK-25 Intermeshing Co-rotating Twin-Screw extruder (48:1 L/D) with no die attached at the exit. The extruder was equipped with a water cooling system as well as a vacuum system for the removal of entrapped air and volatiles. The extruder was supplied with materials, matrix polymer and reinforcement via two K-Tron twin-screw gravimetric feeders, except in the case of the Type 40 carbon fibers and the TP1-sized carbon fibers which had to be fed manually at controlled intervals. The reinforcement fiber was fed into the extruder with an intermeshing co-rotating twin-screw side feeder. The polymer mass flow rate was 10 kg/hour. A sheet was produced using a Farrel 6×13 two-roll mill retrofitted to a variable speed drive system that allowed the two-roll mill to be used similarly to a sheet calendaring system onto which extrudate from the twin-screw extruder (with no die) was deposited to form the sheet material. The rate of rotation of the rolls was 5 rpm. Sheets of neat polymer were produced in the same way, but without the introduction of fiber. Laminate materials were produced by consolidating several layers of the sheet material under vacuum bag in an oven in order to produce laminates of the desired thickness.

Mechanical testing was performed on either a MTS Q-Test 10 Electromechanical Test System or a MTS 810 Load Frame. Both systems use MTS TestWorks 4 software. Tensile testing was performed in accordance with ASTM D638; type I specimens. Flexural testing was performed in accordance with ASTM D790. The polymer used was Profax 6331 polypropylene (PP) homopolymer with a MFI of 12 g/10 min at 230° C. Honeywell A-C 950P, a maleic anhydride grafted polypropylene (MAPP), was mixed with the Profax 6331 at a 1.0 wt. % loading level. Four types of fiber were used: (1) "Carbon-APS", discontinuous carbon fibers supplied by the SGL Group, received as chopped tows ¼" in length with SGL's proprietary APS sizing; (2) "Carbon-TP-1", discontinuous carbon fibers supplied by the SGL Group, received as chopped tows ¼" in length with SGL's proprietary TP-1 sizing; (3) "Carbon T-40" (Recafil®) supplied by the SGL Group, comprising reclaimed chopped fibers of varying length in bundles averaging 40 mm in length, and having a carbon fiber content of 90 wt. %, a glass fiber content of 4 wt. %, a polymer fiber content of 3 wt. % and a binder content of 3 wt. %; (4) Aramid (Kevlar®) fibers received as chopped bundles ¼" in length. In all cases, the fiber loading level was about 15 wt. % (~8 vol. % in the case of carbon fiber). The results of the tensile and flexural mechanical tests in the 0° (or machine) direction are provided in Table 1, and results of the mechanical tests in the 90° (or transverse) direction are provided in Table 2. It can be seen that the properties of the fiber-reinforced polypropylene materials are highly anisotropic, exhibiting high strength and modulus values in the 0° direction.

TABLE 1

Mechanical Properties of 15 wt. % Discontinuous Fiber Reinforced Composite Materials

| Matrix: Profax 6331 PP and 1% wt A-C 950P MAPP | | | Laminate Panel | | | |
| --- | --- | --- | --- | --- | --- | --- |
| | | | 0° Tensile | | 0° Flexure | |
| Fiber Type | Length (inch) | Loading (wt. %) | Strength (MPa) | Modulus (GPa) | Strength (MPa) | Modulus (GPa) |
| Neat Matrix | N/A | N/A | 39.9 | 1.9 | 50.9 | 3.3 |
| Carbon - APS | 0.25 | 15% | 86.6 | 9.7 | 113.8 | 10.6 |
| Carbon -T 40 | Random | 15% | 106.1 | 11.6 | 141.1 | 11.1 |
| Carbon-MIT-RF | 0.25 | 15% | 104.5 | 10.1 | 130.7 | 11.4 |
| Aramid | 0.25 | 15% | 94.2 | 3.9 | 92.0 | 4.1 |

TABLE 2

Mechanical Properties of 15 wt. % Discontinuous Fiber Reinforced Composite Materials

| Matrix: Profax 6331 PP and 1% wt A-C 950P MAPP | | | Laminate Panel 90° Tensile | |
| --- | --- | --- | --- | --- |
| Fiber Type | Length (inch) | Loading (wt. %) | Strength (MPa) | Modulus (GPa) |
| Neat Matrix | N/A | N/A | 34.1 | 2.0 |
| Carbon - APS | 0.25 | 15% | 35.5 | 3.1 |
| Carbon -T 40 | Random | 15% | 35.7 | 2.5 |
| Carbon-MIT-RF | 0.25 | 15% | 37.5 | 3.0 |
| Aramid | 0.25 | 15% | 28.5 | 2.3 |

Example 2

Fiber reinforced sheets and laminates were produced according to the description in Example 1, except that the fiber loading level was in all cases about 20 wt. % (~11 vol. % in the case of carbon fiber). As in Example 1, tensile testing was performed in accordance with ASTM D638 (type I specimens) and flexural testing was performed in accordance with ASTM D790. The results of the tensile and flexural mechanical tests in the 0° (or machine) direction are provided in Table 3, from which it can be seen that the polypropylene fiber-reinforced composites exhibit high strength and modulus values in the 0° direction.

TABLE 3

Mechanical Properties of 20 wt. % Discontinuous Fiber Reinforced Composite Materials

| | Matrix: Profax 6331 PP and 1% wt A-C 950P MAPP | | Laminate Panel | | | |
| --- | --- | --- | --- | --- | --- | --- |
| | | | 0° Tensile | | 0° Flexure | |
| Fiber Type | Length (inch) | Loading (wt. %) | Strength (MPa) | Modulus (GPa) | Strength (MPa) | Modulus (GPa) |
| Neat Matrix | N/A | N/A | 39.9 | 1.9 | 50.9 | 3.3 |
| Carbon - APS | 0.25 | 20% | 97.3 | 10.0 | 126.4 | 11.9 |
| Carbon - TP1 | 0.25 | 20% | 114.4 | 11.6 | 159.7 | 13.4 |
| Carbon -T 40 | Random | 20% | 116.9 | 16.1 | 156.2 | 14.5 |

Example 3

Compounding was performed using a Coperion ZSK-25 Intermeshing Co-rotating Twin-Screw extruder (48:1 L/D) with no die attached at the exit. The extruder was equipped with a water cooling system as well as a vacuum system for the removal of entrapped air and volatiles. The extruder was supplied with materials, matrix polymer and reinforcement via two K-Tron twin-screw gravimetric feeders, except in the case of the Type 40 carbon fibers and the TP1-sized carbon fibers which had to be fed manually at controlled intervals. The reinforcement fiber was fed into the extruder with an intermeshing co-rotating twin-screw side feeder. The polymer mass flow rate was 10 kg/hour. Sheet was produced using a Farrel 6×13 two-roll mill retrofitted to a variable speed drive system that allowed the two-roll mill to be used similarly to a sheet calendaring system onto which extrudate from the twin-screw extruder (with no die) was deposited to form the sheet material. The rate of rotation of the rolls was 5 rpm. Sheets of neat polymer were produced in the same way, but without the introduction of fiber. Laminate materials were produced by consolidating several layers of the sheet material under vacuum bag in an oven in order to produce laminates of the desired thickness. Mechanical testing was performed on either a MTS Q-Test 10 Electromechanical Test System or a MTS 810 Load Frame. Both systems use MTS TestWorks 4 software. Tensile testing was performed in accordance with ASTM D638; type I specimens. Flexural testing was performed in accordance with ASTM D790. The polymer used was DuPont Zytel® 7301 NC010 polyamide 6 (PA6). Three types of fiber were used: (1) "Carbon-APS", discontinuous carbon fibers supplied by the SGL Group, received as chopped tows ¼" in length with SGL's proprietary APS sizing; (2) "Carbon T-40" (Recafil®) supplied by the SGL Group, comprising reclaimed chopped fibers of varying length in bundles averaging 40 mm in length, and having a carbon fiber content of 90 wt. %, a glass fiber content of 4 wt. %, a polymer fiber content of 3 wt. % and a binder content of 3 wt. %; (3) Glass-TF674, discontinuous glass fibers supplied by Johns Manville, received as chopped strands 4 mm (0.16 inches) in length with John Manville' proprietary Thermoflow® 674 sizing. In all cases, the fiber loading level was about 20 wt. % (~14 vol. % in the case of carbon fiber and ~10 vol. % in the case of glass fiber). The results of the tensile and flexural mechanical tests in the 0° (or machine) direction are provided in Table 4, and results of the mechanical tests in the 90° (or transverse) direction are provided in Table 5. It can be seen that the properties of the fiber-reinforced polyamide 6 materials are highly anisotropic, exhibiting high strength and modulus values in the 0° direction.

TABLE 4

Mechanical Properties of 20 wt. % Discontinuous Fiber Reinforced Composite Materials

| | Matrix: Zytel ® 7301 Polyamide 6 | | Laminate Panel | | | |
| --- | --- | --- | --- | --- | --- | --- |
| | | | 0° Tensile | | 0° Flexure | |
| Fiber Type | Length (inch) | Loading (wt. %) | Strength (MPa) | Modulus (GPa) | Strength (MPa) | Modulus (GPa) |
| Neat Matrix | N/A | N/A | 87.2 | 4.0 | — | 3.7 |
| Carbon - APS | 0.25 | 20% | 242.5 | 18.3 | 250.3 | 16.0 |
| Carbon -T 40 | Random | 20% | 225.5 | 17.8 | 305.9 | 15.4 |
| Glass TF-674 | 0.16 | 20% | 142.5 | 8.0 | 235.1 | 7.7 |

TABLE 5

Mechanical Properties of 20 wt. % Discontinuous Fiber Reinforced Composite Materials

| Matrix: Zytel ® 7301 Polyamide 6 | | | Laminate Panel 90° Tensile | |
|---|---|---|---|---|
| Fiber Type | Length (inch) | Loading (wt. %) | Strength (MPa) | Modulus (GPa) |
| Neat Matrix | N/A | N/A | 85.7 | 3.9 |
| Carbon - APS | 0.25 | 20% | 110.9 | 6.1 |
| Carbon -T 40 | Random | 20% | 110.0 | 6.4 |
| Glass TF-674 | 0.16 | 20% | 87.3 | 5.1 |

Example 4

Fiber reinforced sheets and laminates were produced according to the description in Example 3, except that the fiber loading level was in all cases about 30 wt. % (~21 vol. % in the case of carbon fiber and ~16% in the case of glass fiber). As in Example 3, tensile testing was performed in accordance with ASTM D638 (type I specimens) and flexural testing was performed in accordance with ASTM D790. The results of the tensile and flexural mechanical tests in the 0° (or machine) direction are provided in Table 6, from which it can be seen that the fiber-reinforced polyamide 6 composites exhibit high strength and modulus values in the 0° direction.

TABLE 6

Mechanical Properties of 30 wt. % Discontinuous Fiber Reinforced Composite Materials

| Matrix: Zytel ® 7301 Polyamide 6 | | | Laminate Panel | | | |
|---|---|---|---|---|---|---|
| | | | 0° Tensile | | 0° Flexure | |
| Fiber Type | Length (inch) | Loading (wt. %) | Strength (MPa) | Modulus (GPa) | Strength (MPa) | Modulus (GPa) |
| Neat Matrix | N/A | N/A | 87.2 | 4.0 | — | 3.7 |
| Carbon - APS | 0.25 | 30% | 263.8 | 23.8 | 394.5 | 22.8 |
| Carbon -T 40 | Random | 30% | 239.4 | 23.7 | 350.6 | 20.6 |
| Glass TF-674 | 0.16 | 30% | 181.4 | 10.4 | 279.7 | 9.9 |

Example 6

Fiber reinforced sheets and laminates were produced according to the description in Example 3, except that mass flow rate in the extruder was run at two different flow rates, 10 kg/hr and 15 kg/hr, and the fiber loading level of the Carbon-APS fibers used in this example was about 15 wt. % (~10 vol. %). It can be seen from Table 7 that changing the mass flow rate in this range did not significantly influence the mechanical properties of these fiber-reinforced polyamide 6 composites.

TABLE 7

Mechanical Properties of 15 wt. % Discontinuous Fiber Reinforced Composite Materials

| Matrix: Zytel ® 7301 Polyamide 6 | Laminate Panel | | | |
|---|---|---|---|---|
| Fiber: Carbon-APS | 0° Tensile | | 0° Flexure | |
| Mass Flow Rate (kg/hr) | Strength (MPa) | Modulus (GPa) | Strength (MPa) | Modulus (GPa) |
| 10 | 212.0 | 14.0 | 313.2 | 13.3 |
| 15 | 224.0 | 14.8 | 313.7 | 13.3 |

Example 6

Fiber reinforced sheets and laminates were produced according to the description in Example 3, except that the sheet-forming rolls were rotated at four different rates of 5, 10, 15 and 20 rpm, and the fiber loading level of the Carbon-AP fibers used in this example was about 15 wt. % (~10 vol. %). It can be seen from Table 8 that there seems to be a small, systematic increase in tensile strength and modulus with increasing rpm, but overall the mechanical properties were not affected much by the rate of rotation of the rolls in this range.

TABLE 8

Mechanical Properties of 15 wt. % Discontinuous Fiber Reinforced Composite Materials

| Matrix: Zytel ® 7301 Polyamide 6 | Laminate Panel | | | |
|---|---|---|---|---|
| Fiber: Carbon-APS | 0° Tensile | | 0° Flexure | |
| Two-roll rate (rpm) | Strength (MPa) | Modulus (GPa) | Strength (MPa) | Modulus (GPa) |
| 5 | 212.0 | 14.0 | 313.2 | 13.3 |
| 10 | 215.8 | 14.4 | 306.1 | 12.5 |

TABLE 8-continued

Mechanical Properties of 15 wt. % Discontinuous Fiber Reinforced Composite Materials

| Matrix: Zytel ® 7301 Polyamide 6 | Laminate Panel | | | |
|---|---|---|---|---|
| Fiber: Carbon-APS | 0° Tensile | | 0° Flexure | |
| Two-roll rate (rpm) | Strength (MPa) | Modulus (GPa) | Strength (MPa) | Modulus (GPa) |
| 15 | 224.4 | 14.6 | 314.7 | 12.6 |
| 20 | 226.5 | 14.9 | 312.2 | 12.6 |

Example 7

Polypropylene sheets reinforced with about 15 wt. % discontinuous carbon fibers (Carbon-T 40) were formed as described in Example 1, and then cut into strips with dimensions 4×1 inches; the longer dimension being in the 0° direction. Grid lines were drawn across the central 2 inches of the specimens, spaced 0.2 inches apart vertically and 0.2 inches apart horizontally, creating segments whose dimensions could be measured after the drawing process. The strips were then clamped in the jaws of an MTS with a 50 KN load cell, equipped with an environmental chamber, such as to provide a 2 inch gauge length. After heating the chamber to a temperature capable of permitting effective drawing (~230° C., as measured by a thermocouple close to the sample), the sample was drawn to the desired draw ratio at a strain rate of 0.1%/s. Laminate materials were produced by consolidating several layers of the drawn material under vacuum bag in an oven in order to produce laminates of the desired thickness. Mechanical testing was performed on a MTS 810 Load Frame, which uses MTS TestWorks 4 software. Tensile testing was performed in accordance with ASTM D638, with the exception that smaller, rectangular test specimens were used, having a gauge length of 2 inches and a width of 0.5 inches. The recorded draw ratio of the tested specimens were taken as the mean draw ratio of all the marked segments in the consolidated strips lying in the region between the MTS grips. The results of the tensile tests in the 0° (drawing) direction are provided in Table 9, from which it can be seen that both the tensile strength and tensile modulus of the fiber-reinforced PP laminates increased significantly with draw ratio.

TABLE 9

| Matrix: Profax 6331 PP | Laminate Properties 0° Tensile | |
|---|---|---|
| Fiber: Carbon-T 40 Draw ratio | Strength (MPa) | Modulus (GPa) |
| 1 | 92.9 | 8.4 |
| 1.5 | 104.4 | 16.4 |
| 2 | 134.5 | 18.5 |

Example 8

Polyamide 6 sheets reinforced with about 15 wt. % discontinuous carbon fibers (Carbon-APS) were formed as described in Example 3, and then cut into strips with dimensions 2.5×2 inches; the longer dimension being in the 0° direction. Grid lines were drawn across the central 0.5 inches of the specimens, spaced 0.125 inches apart vertically and 0.5 inches apart horizontally, creating segments whose dimensions could be measured after the drawing process. The strips were then clamped in the jaws of an MTS with a 50 KN load cell, equipped with an environmental chamber, such as to provide a 0.75 inches gauge length. After heating the chamber to a temperature capable of permitting effective drawing (~250° C., as measured by a thermocouple close to the sample), the sample was drawn to the desired draw ratio at a strain rate of 0.5%/s or 1%/s. Laminate materials were produced by consolidating several layers of the drawn material under vacuum bag in an oven in order to produce laminates of the desired thickness. Mechanical testing was performed on a MTS 810 Load Frame, which uses MTS TestWorks 4 software. Tensile testing was performed in accordance with ASTM D638, with the exception that smaller, rectangular test specimens were used, having a gauge length of 0.75 inches and a width of 0.5 inches. The recorded draw ratio of the tested specimens were taken as the mean draw ratio of all the marked segments in the consolidated strips lying in the region between the MTS grips. The results of the tensile tests in the 0° (drawing) direction are provided in Table 10, from which it can be seen that the tensile strength and, especially, the tensile modulus of the fiber-reinforced PA6 laminates increased significantly with draw ratio.

TABLE 10

| Matrix: Zytel ® 7301 Polyamide 6 Fiber: Carbon-APS | | Laminate Properties 0° Tensile | |
|---|---|---|---|
| Draw ratio | Strain rate (%/s) | Strength (MPa) | Modulus (GPa) |
| 1 | 0.5 | 193.7 | 14.0 |
| 1.5 | 0.5 | 206.6 | 33.5 |
| 2 | 0.5 | 241.8 | 37.7 |
| 1.5 | 1.0 | 235.2 | 36.5 |

Example 9

Polypropylene sheets reinforced with about 15 wt. % discontinuous carbon fibers (Carbon-APS) were formed as described in Example 1, and then cut into strips with dimensions 64×6 inches; the longer dimension being in the 0° direction. Grid lines were drawn across the central 32 inches of the specimens, spaced 1 inches apart vertically and 1 inches apart horizontally, creating segments whose dimensions could be measured after the drawing process. Manual drawing took place by first clamping one end of the strip and passing it through an infra-red heating oven (with a bank of IR heaters above it and below it). In this way a 32×6 inch area of the strip was directly exposed to the heating source. After heating the chamber to a temperature capable of permitting effective drawing (~185° C., as measured by a pyrometer on the surface of the sample), the sample was drawn to the desired draw ratio by slowly pulling the free end manually. Laminate materials were produced by consolidating several layers of the drawn material under vacuum bag in an oven in order to produce laminates of the desired thickness. Mechanical testing was performed on a MTS 810 Load Frame which uses MTS TestWorks 4 software. Tensile testing was performed in accordance with ASTM D638, with type 1 specimens. The recorded draw ratio of the tested specimens were taken as the mean draw ratio of all the marked segments in the consolidated strips lying in the region between the MTS grips. The results of the tensile tests in the 0° (drawing) direction are provided in Table 11 from which it can be seen that the tensile strength and, especially, the tensile modulus of the fiber-reinforced PP laminates increased significantly with draw ratio.

TABLE 11

| Matrix: Profax 6331 PP | Laminate Properties 0° Tensile | |
| --- | --- | --- |
| Fiber: Carbon-APS Draw ratio | Strength (MPa) | Modulus (GPa) |
| 1 | 79.7 | 10.9 |
| 1.75 | 97.3 | 19.2 |

The invention being thus described, it will be obvious that the same may be varied in many ways. Such variations are not to be regarded as a departure from the spirit and scope of the inventions and all such modifications are intended to be included within the scope of the following claims.

What is claimed is:

1. A method for preparing a polymer composite composition comprising:
    mixing discontinuous fibers and one or more polymers and/or oligomers to form a mixture in an extruder; wherein said polymer and/or oligomer is a thermoplastic or a thermoset; and wherein said discontinuous fibers are aramid fibers, carbon fibers, ceramic fibers, glass fibers, polymeric fibers, or mineral-based fibers, or a combination thereof;
    rolling the mixture to form the polymer composite composition into a sheet, wherein the rolling orients the discontinuous fibers in one direction; and
    wherein one or more stages of the method minimize the fiber length attrition.

2. The method of claim 1, wherein said discontinuous fibers comprise aramid fibers, carbon fibers, glass fibers, or a combination thereof.

3. The method of claim 1, wherein said extruder is a single-screw or twin-screw extruder.

4. The method of claim 1, wherein the method further comprises drawing the sheet after the rolling step, and wherein the drawing further orients the discontinuous fibers in the same direction.

5. The method of claim 1, wherein the discontinuous fiber is present in the composite sheet at a load of between about 2 wt. % and about 75 wt. %; and wherein the polymer and/or oligomer can be present in the composite at a load of between about 25 wt. % and about 98 wt. %.

6. The method of claim 1, wherein the extruder feeds into a rolling process through a die that is larger than the extruder opening, through a die that is the same size as the extruder opening, or without passing the extrudate through a die.

7. The method of claim 1, further comprising laminating the sheet to form a laminate.

8. The method of claim 7, wherein the laminate further comprises a composite sheet prepared by a different method, a polymer sheet, a metal sheet, or combinations thereof.

9. The method of claim 1 wherein the said mixing occurs during partial or complete in-situ polymerization of a monomer and/or oligomer.

10. The method of claim 1, wherein the rolling step is performed between two or more rollers.

11. The method of claim 1, wherein the rolling step is performed between multiple sets of rollers.

12. The method of claim 1 wherein the combining step further comprising combining additional ingredients; and wherein the mixing step further comprising mixing additional ingredients.

13. The method of claim 1 further comprising chipping the sheet to form pellets.

14. The method of claim 1 further comprising forming a shaped composite product.

15. The method of claim 14, wherein the forming step is compression molding, pressure forming, thermoforming, or injection molding.

* * * * *